United States Patent [19]

Hendriks

[11] Patent Number: 5,234,375
[45] Date of Patent: Aug. 10, 1993

[54] MUSHROOM HARVESTING EQUIPMENT

[76] Inventor: Wilhelmus N. J. Hendriks, Ruysdaelstraat 3, NL-5953 HW, Reuver, Netherlands

[21] Appl. No.: 659,310
[22] PCT Filed: Aug. 10, 1990
[86] PCT No.: PCT/NL90/00113
§ 371 Date: Apr. 10, 1991
§ 102(e) Date: Apr. 10, 1991
[87] PCT Pub. No.: WO91/02450
PCT Pub. Date: Mar. 7, 1991

[30] Foreign Application Priority Data

Aug. 22, 1989 [NL] Netherlands ............ 8902114

[51] Int. Cl.$^5$ ............................................. A01D 46/00
[52] U.S. Cl. ................... 460/135; 56/121.46; 56/327.1
[58] Field of Search ........... 460/135, 123, 134, 136, 460/149, 150; 56/121.4, 121.46, 327.1

[56] References Cited

U.S. PATENT DOCUMENTS 3,164,182  1/1965  Hughes et al.
3,635,005  1/1972  Persson .......................... 56/327.1
4,472,929  9/1984  MacCanna et al. ............ 56/327.1
4,545,186  10/1985 MacCanna ..................... 56/327.1
5,035,109  7/1991  van den Top ................... 56/327.1

FOREIGN PATENT DOCUMENTS 1427779  2/1966  France .
2071451  9/1971  France .
2336092  7/1977  France .
2337591  8/1977  France .
2419033  10/1979 France .
7107587  12/1971 Netherlands .

Primary Examiner—Terry Lee Melius
Attorney, Agent, or Firm—Beveridge, DeGrandi, Weilacher & Young

[57] ABSTRACT

Mushroom harvesting equipment with an intake section that reaches over the mushroom cultivating bed, a stem cutting section and a transporting and sorting section. The mushrooms are cut off by cutting wheels and transported via wheel to the sorting section where the sorting to dimension of the mushrooms is realized by widening transporting cords. The mushrooms fall in containers placed on scales.

9 Claims, 3 Drawing Sheets

MUSHROOM HARVESTING EQUIPMENT

BACKGROUND OF THE INVENTION

1. Field of the Invention

The present invention relates to a device for the automatic harvesting of mushrooms.

2. Description of the Related Art

When mushrooms are harvested they are manually picked. The person that harvests the mushrooms must make his choice of the desired dimension by sight. The stem of the mushroom must then be cut off. This happens usually with a hand-held knife. The mushroom is then put down in a box or carton. This way of harvesting requires great skill and is very labor intensive. There have been trials with fully automatic harvesting machines, but these have proven to be failures. There are also machines that harvest the whole cultivating bed in one passage. This way of operation has the disadvantage that the harvest is a mixture of too large to too small. In this way the cultivating bed is not completely used.

SUMMARY OF THE INVENTION

The mushroom harvesting equipment of the present invention is equipped with a stemcutting section and a transportation section which has a sorting capability to dimension. The intake section reaches over the mushroom cultivating bed, allowing the operator to use both hands for harvesting. The result is that, in an easier way, a large production can be made with a better dimension classification, which gives the product a higher quality.

The mushroom harvesting equipment of the present invention foresees a combination of a manual picking and mechanical processing of the mushrooms. This means that the machine is equipped with over-the-cultivating bed reaching intake equipment which uses cords for delivery to the stemcutting section. The stemcutting section consists of two circular cutters that rotate in opposite direction, after which, the cut-off champions are carried off and, in the mean time, selected by dimension. The invention will be described in conjunction with the drawings.

BRIEF DESCRIPTION OF THE DRAWINGS

In FIG. 1, the intake equipment (1) is shown with cutting section (2) and the transport section (3). The mushrooms (4) are placed on the transportation cords (5) and (6). These move as indicated by arrows (7) and (8). The mushrooms (4) are transported to the cutting section (2) where two oppositely rotating cutting wheels (9) and (10) are found. The cutting wheels overlap each other partially and have a circumferential speed which is equal to or greater than the transportation speed of the mushrooms (4). The cut-off mushrooms (4) are then further transported to the end of the intake section (1) where, with the help of wheel (11) (indicated schematically in FIG. 3) which is furnished with a flexible rim, the mushrooms (4) are forced to the transportation section (3). It is possible to adjust the pulleys (14) and 15) so that the cords (12) and (13) are widening. The mushrooms (4) will fall between the cords (12) and (13) when the distance is greater than the diameter of the mushrooms (4). Thus, the widening forms zones (16) and (17) where mushrooms of a certain dimension and tolerance, determined by the widening, will fall through. Containers can be placed in each zone and in this way the mushrooms (4), selected by dimension, can be collected. By packing the containers on scales with a preset weight, it is possible to deliver mushrooms ready for shipping. The containers with the scales can be placed on tray (18). The zones (16) and (17) are marked with indicating fingers (19).

Figure 1:
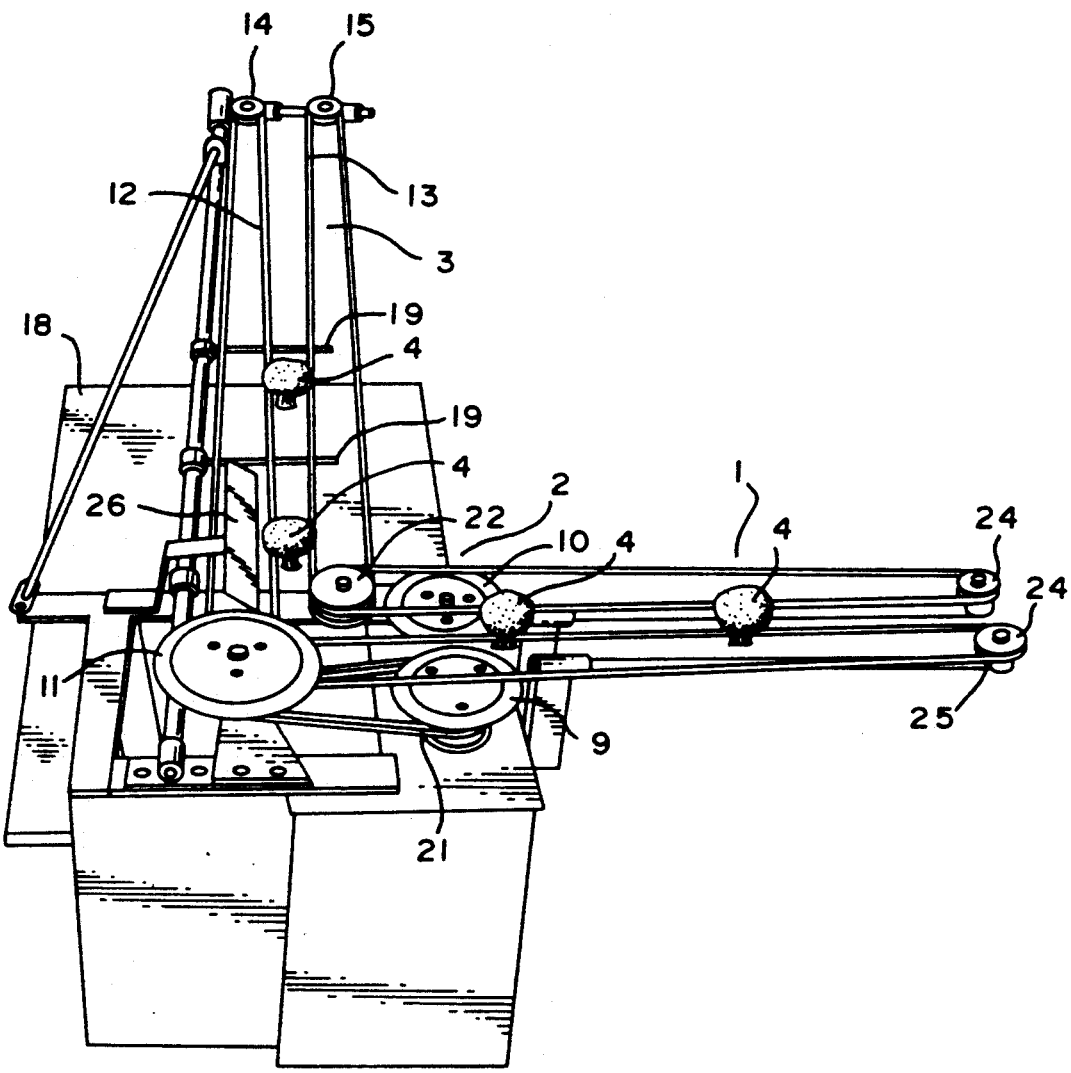
FIG. 1 shows one embodiment of the present invention.
Figure 2:
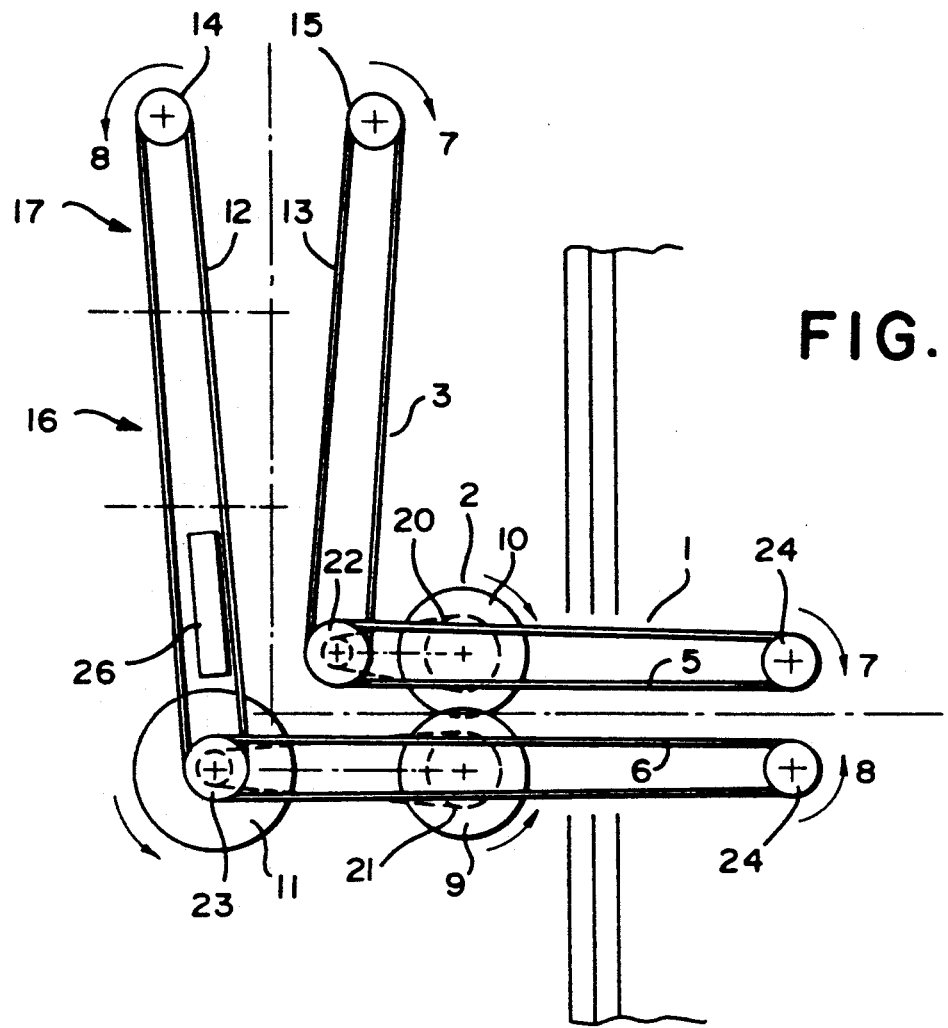
FIG. 2 shows a top view of the transporting means and cutting equipment of one embodiment of the present invention.
Figure 3:
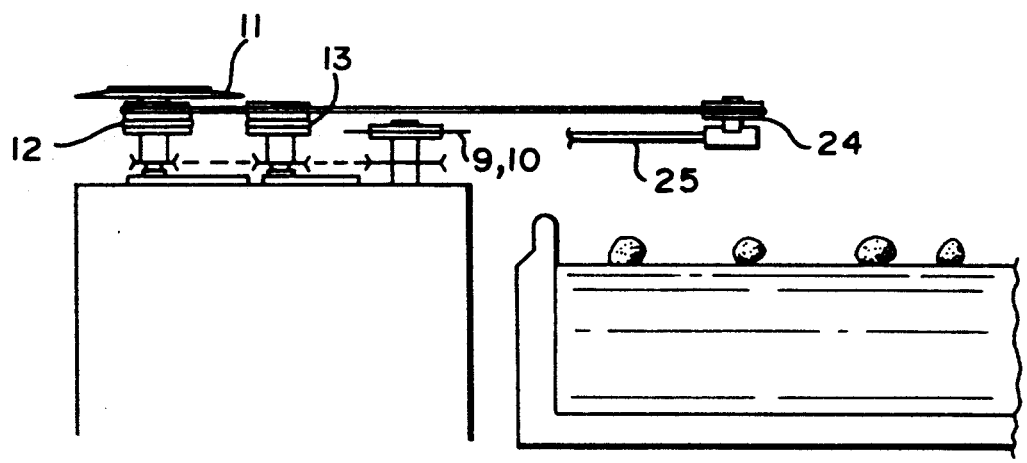
FIG. 3 shows a side view of one embodiment of the present invention with a section of the cultivating bed.

The drive of the transportation means is realized with an (not shown) electrical motor, which drives the shafts of the cutting wheels (9) and (10). The pulleys (22) and (23) are driven via chains or toothed belts (20) and (21). Disk (11) is mounted on the shaft of pulley (23). The pulleys (22) and (23) may have two closely placed grooves for cords. The upper groove is intended for the intake cords and the lower groove for the transporting cords. The intake cords (5) and (6) are tightened with the pulleys (24) which are mounted on arms (25).

On various places are guiding plates (26) mounted to prevent early falling of the mushrooms (4). The cords can have a cross section of a simple circle or a profile with possible extensions for transporting the mushrooms (4).

Figure 4:
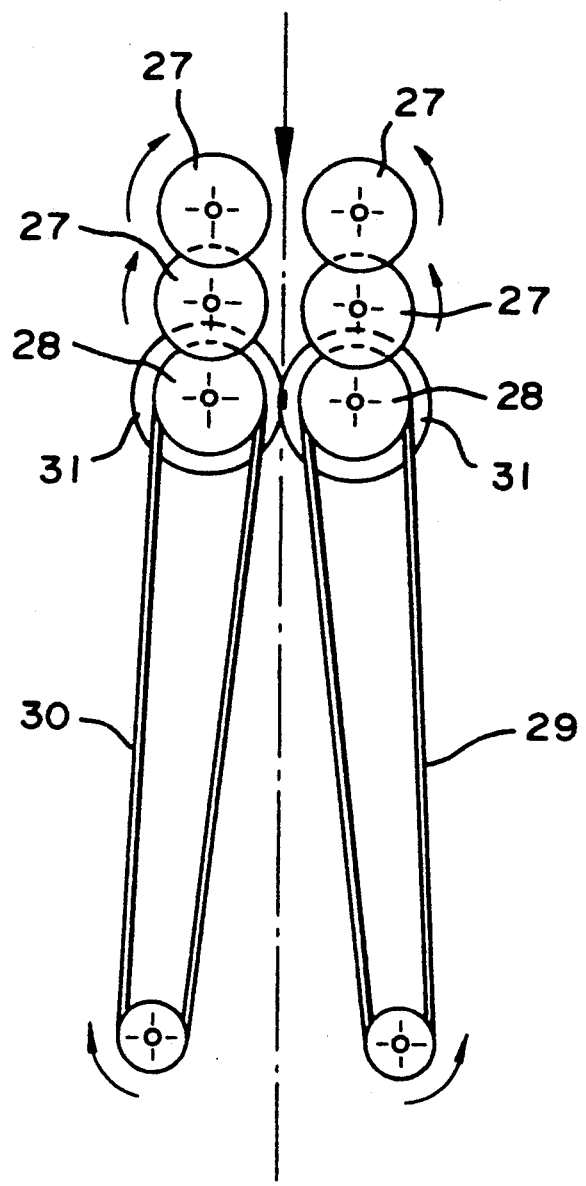
FIG. 4 shows a top view of the intake equipment of another embodiment of the present invention.

In FIG. 4 is drawn a variant of the intake section. Instead of the intake cords, intake disks (27) that rotate in opposite directions are used. These intake disks overlap each other and the pulleys (28) of the transport cords (29) and (30). On the same shafts as those of the pulleys (28) are mounted cutting wheels (31). Because of the overlapping position of the transport wheels (27) and pulleys (28), the mushrooms (4) will be transported to the cutting wheels (31). The transport cords (29) and 30) can be adjusted to widen to obtain the desired sorting. Containers with scales can be placed underneath the transport cords (29) and (30) if necessary.

I claim:

1. Equipment for processing picked mushrooms, comprising:

a stemcutting section for cutting stems from picked mushrooms;

a first set of transport elements for reaching over a mushroom cultivating bed and transporting picked mushrooms to said stemcutting section;

a second set of transport elements provided perpendicular to said first set of transport elements for carrying picked mushrooms away from said stemcutting section, wherein said second set of transport elements widen so as to sort picked mushrooms by dimension; and a transport disk for carrying and driving picked mushrooms when picked mushrooms traverse from said first set of transport elements to said second set of transport elements.

2. Equipment for processing picked mushrooms in accordance with claim 1, wherein said second set of transport elements includes two cord-like elements in a horizontal plane, said cord-like elements being runable at the same speed.

3. Equipment for processing picked mushrooms in accordance with claim 2, wherein said two cord-like elements are placed so as to provide a widening clearance, such that the distance between said two cord-like elements determines sorting dimensions of picked mushrooms.

4. Equipment for processing picked mushrooms in accordance with claim 2, wherein said two cord-like elements can be adjusted to a dimension for sorting picked mushrooms by movable pulleys.

5. Equipment for processing picked mushrooms in accordance with claim 1, wherein said stemcutting section comprises two circular cutters rotatable in opposite directions.

6. Equipment for processing picked mushrooms in accordance with claim 5, wherein said circular cutters are rotatable at a circumferential velocity equal to or greater than a transport speed of picked mushrooms.

7. Equipment for processing picked mushrooms in accordance with claim 1, wherein said first set of transport elements comprises two rows of overlapping rotatable transport disks, a first row of transport disks being rotatable in a direction opposite that of a second row of transport disks.

8. Equipment for processing picked mushrooms in accordance with claim 7, wherein circular cutters are connected to said transport disks.

9. Equipment for processing picked mushrooms in accordance with claim 8, wherein said first set of transport elements includes two cord-like elements in a horizontal plane.

* * * * *